Aug. 17, 1926.
V. L. FARNSWORTH
1,596,167
CABLE WINDING APPARATUS
Filed Dec. 3, 1920    4 Sheets-Sheet 2
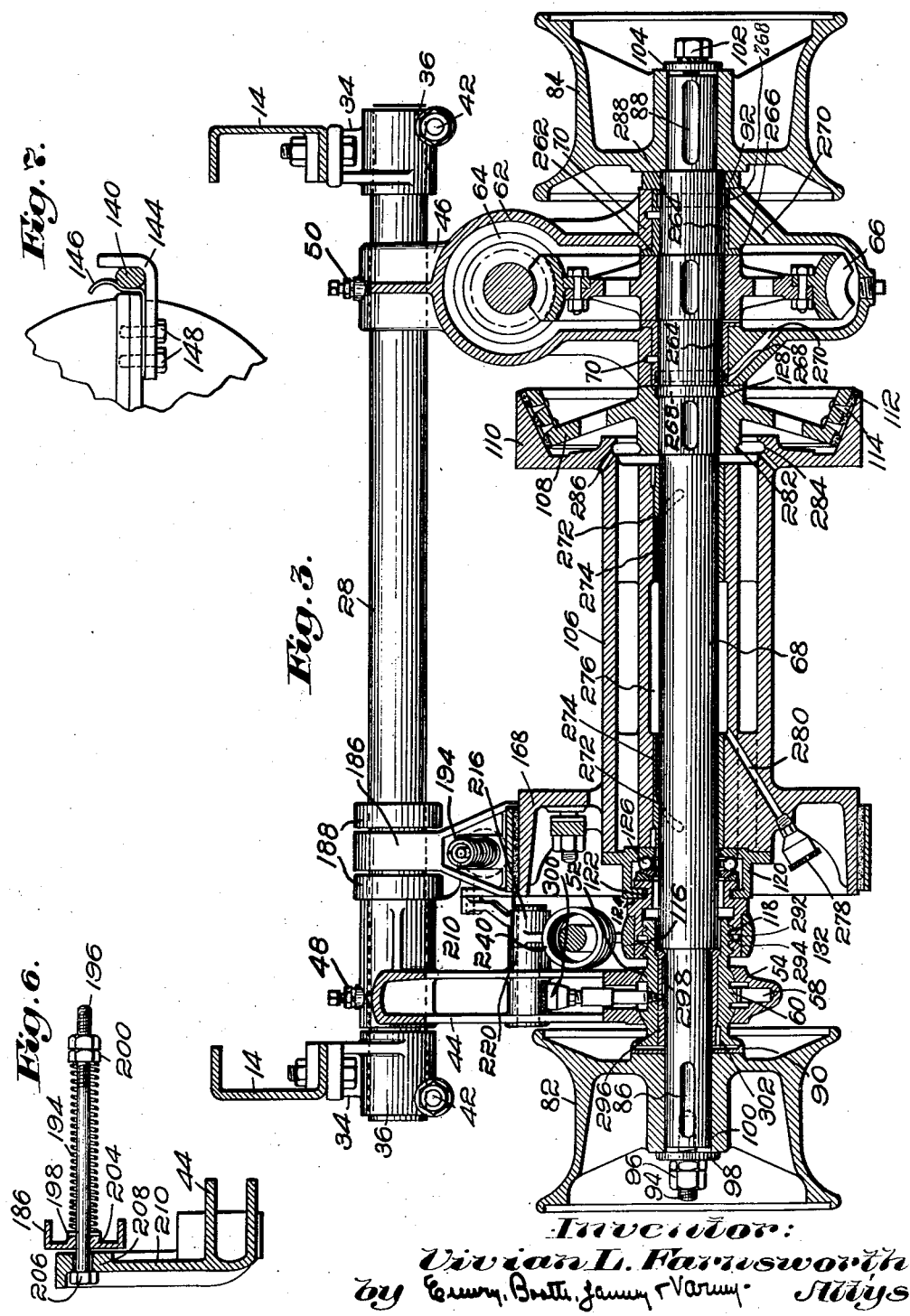
Inventor:
Vivian L. Farnsworth.
by Emery, Booth, Janney & Varney. Attys.

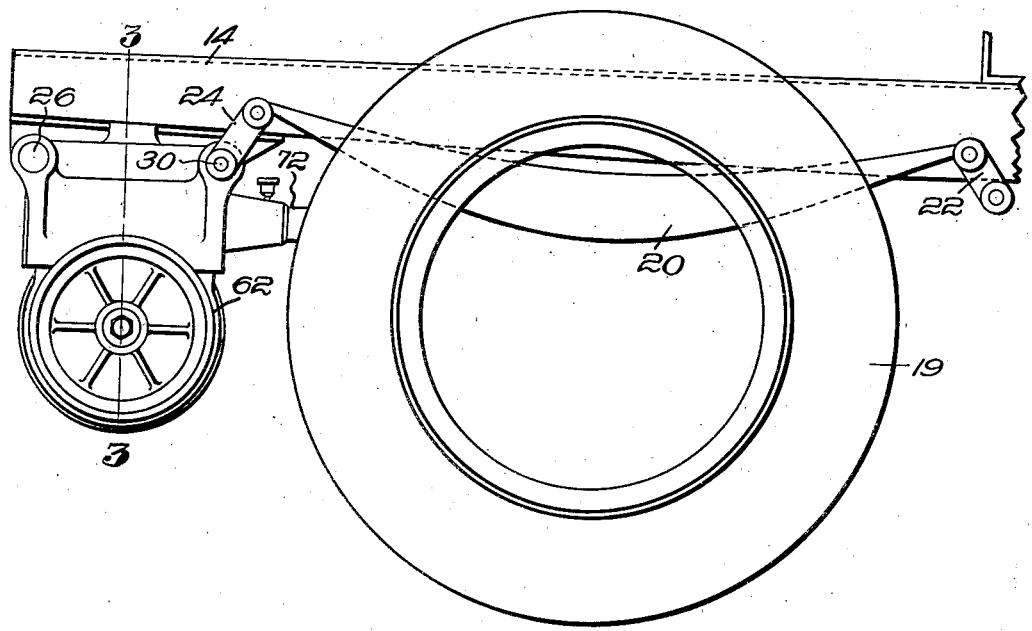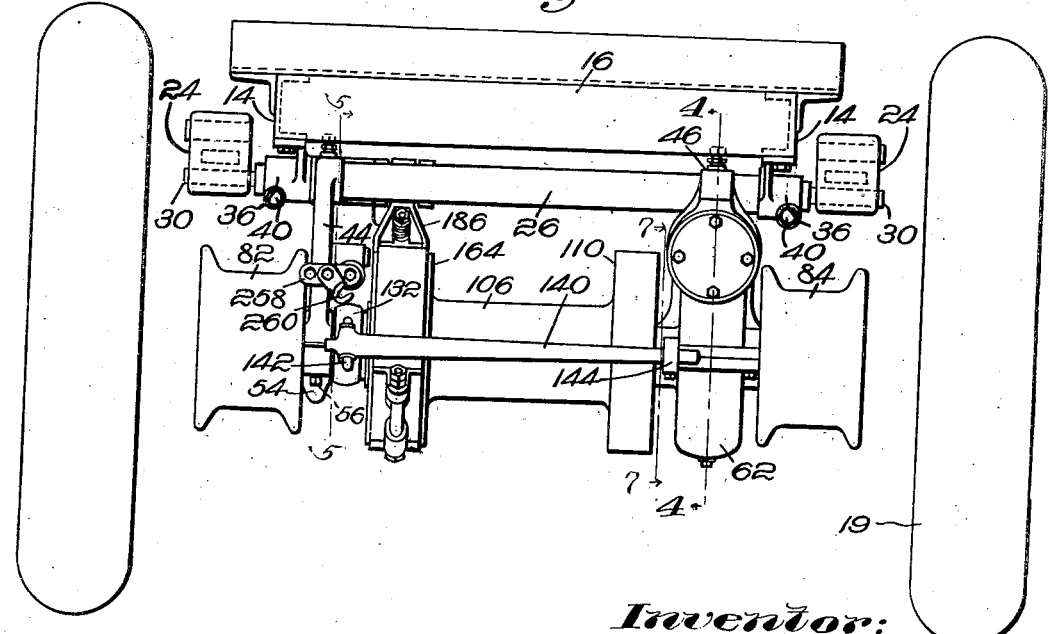

Aug. 17, 1926.

V. L. FARNSWORTH

CABLE WINDING APPARATUS

Filed Dec. 3, 1920

Inventor:
Vivian L. Farnsworth
by Emery, Booth, Janney & Varney
Attys.

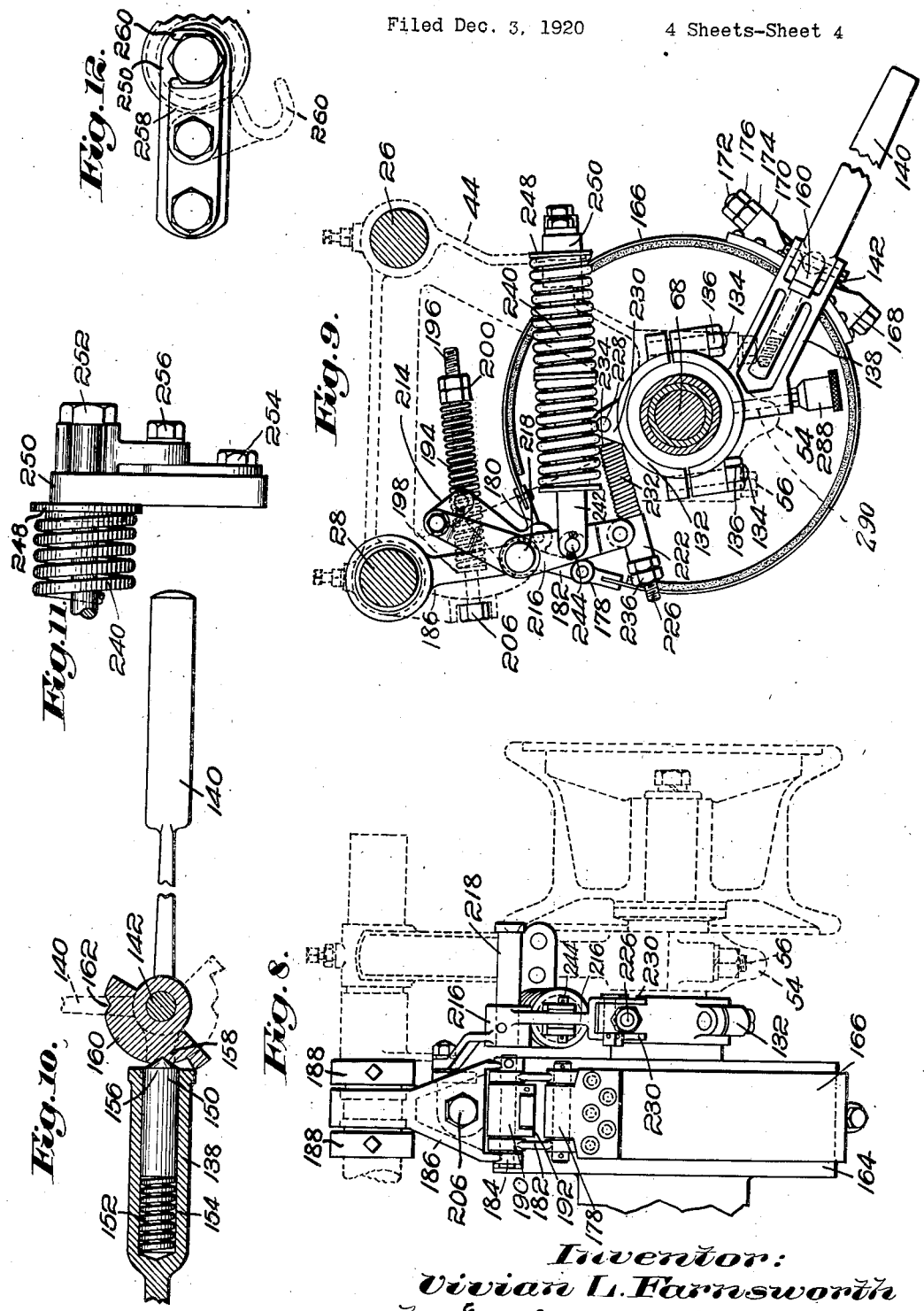

Patented Aug. 17, 1926.

1,596,167

UNITED STATES PATENT OFFICE.

VIVIAN L. FARNSWORTH, OF WINTHROP, MASSACHUSETTS, ASSIGNOR TO MEAD-MORRISON MANUFACTURING COMPANY, OF EAST BOSTON, MASSACHUSETTS, A CORPORATION OF MAINE.

CABLE-WINDING APPARATUS.

Application filed December 3, 1920. Serial No. 428,121.

This invention aims to improve cable-winding apparatus, more particularly motor truck winches and winding drums operated by power furnished by the usual engine which drives the truck.

My invention will be best understood by reference to the following description, when taken in connection with the accompanying drawings of one illustrative embodiment thereof, while its scope will be more particularly pointed out in the appended claims.

In the drawings:—

Fig. 1 is a side elevation of the rear portion of a motor truck equipped with a cable-winding apparatus exemplifying my invention;

Fig. 2 is a rear elevation of the same;

Fig. 3 is a sectional view on an enlarged scale on line 3—3 of Fig. 1;

Fig. 6 is a sectional view on line 6—6 of Fig. 5;

Fig. 7 is a detail sectional view on an enlarged scale on line 7—7 of Fig. 2;

Fig. 8 is an elevation showing in full lines the brake mechanism as viewed from the front,—that is to say, from the side opposite to that shown in Fig. 2, and showing in dotted lines some of the adjacent mechanism;

Fig. 9 is a sectional view similar to Fig. 5, but showing the parts in another position;

Fig. 10 is a sectional view on an enlarged scale on line 10—10 of Fig. 5, showing the hand lever in full lines in one position, and in dotted lines in another position.

Fig. 11 is a detail plan illustrating the latch used for locking the brake mechanism in position to allow the drum to rotate freely in either direction; and Fig. 12 is a detail rear elevation of the parts shown in Fig. 11.

Figure 5:
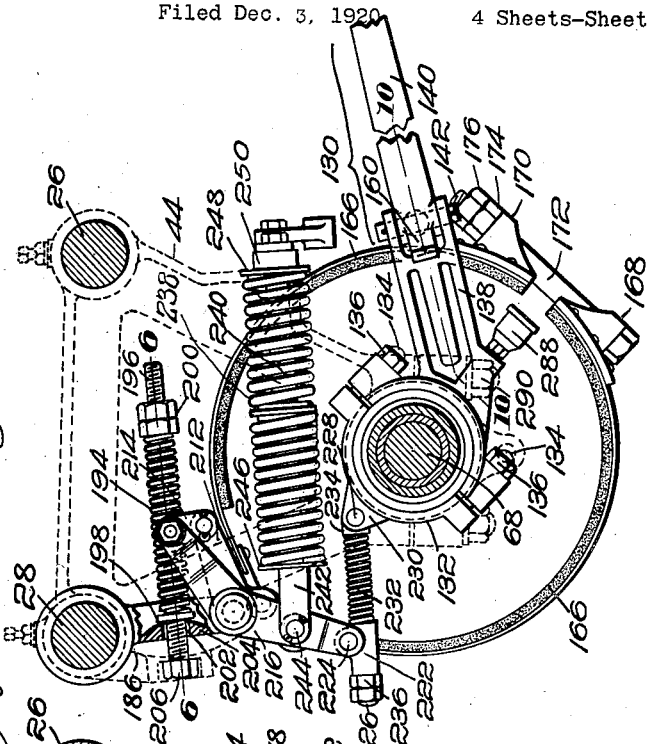
Fig. 5 is a sectional view on an enlarged scale on line 5—5 of Fig. 2.

Referring to the drawings, and to the embodiment of my invention which I have selected for exemplification, I have shown a motor car chassis having a usual frame comprising a pair of longitudinal bars or side members, herein channel bars 14, connected by a transverse bar 16. The chassis has usual wheels 19 and springs 20, herein conventionally shown in Fig. 1, said springs being connected to the frame by usual shackles 22 and 24.

I shall now describe what may be termed an under-slung cable-winding apparatus conveniently disposed beneath the rear end of the chassis frame. Connecting the side members 14 of the chassis frame are two rods 26 and 28, the latter conveniently serving for the pivotal support of the links 24, and to that end being provided with reduced terminal portions 30 forming pivots for the shackles. The cross-rods may be conveniently secured to the side frame members by brackets 32 and 34 bolted to said members, and provided with suitable bosses 36 and 38, in which the terminal portions of the cross-rods 26 and 28 are received, and securely fastened as by clamping bolts 40 and 42.

The cross rods support shaft hangers 44 and 46, through which the rods extend, said hangers being suitably secured to the rods as by set screws 48 and 50 threaded into the hangers and engaging the rods. One of the hangers, here in the left-hand hanger in Fig. 3, presents a support for a spherical bearing 52 seated in a corresponding opening in the hanger, which is split in a horizontal plane containing the axis of the bearing,—that is to say, the hanger is provided with a cap 54 secured to the body of the hanger as by studs 56 (see Fig. 2). The bearing may be held against rotation in the hanger by suitable means, herein a pin 58 received in a slot 60 provided in the under side of the bearing (see Fig. 3).

The other hanger presents a housing 62 for a worm 64 and worm-gear 66, the latter being secured to a shaft 68 mounted at one end in the spherical bearing 52 and at its other end in bearings 70 presented by the housing 62. The latter is herein divided in a horizontal plane (see Fig. 4) containing the axis of the shaft. The worm may be conveniently formed on a worm shaft 72 mounted in suitable bearings 74 and 76 appropriately secured to the housing, as by cap-screws 78 and 80. A suitable thrust-bearing 82 receives the thrust of the worm. In practice, the worm-shaft will be suitably connected to and driven by the truck engine, through its usual and well-known transmission gearing. When the cable-winding apparatus is in use, the shaft 68 will be driven by the worm and worm-gear in a clockwise direction, as viewed in Fig. 4.

Winches 82 and 84, carried by the shaft outwardly beyond the hangers 44 and 46, are suitably attached to the shaft, as by keys 86 and 88. Thrust-washers 90 and 92 are interposed between the winches 82 and 84 and the hangers 44 and 46, respectively. The winches are appropriately secured against endwise movement on the shaft. In the present example, the winch 82 is held in place by a stud 94 threaded into the end of the shaft, and having a pair of nuts 96 operating against a washer 98, which bears against the end of the plug of the winch. The end of the shaft terminates short of the outer end of the hub, leaving a clearance space 100, thereby permitting axial adjustment of the winch to take up wear on the thrust-washer 90. The winch 84 is simliarly secured against endwise movement by a cap-screw 102 threaded into the end of the shaft and operating against a washer 104 against the outer end of the hub of the winch.

The shaft also supports a cable-winding drum 106, loosely mounted thereon to turn and slide axially relatively thereto. The drum may be clutched to and unclutched from the shaft by a suitable clutch, herein of the cone type, comprising inner and outer members 108 and 110, one keyed to the shaft and the other conveniently formed as an integral part of the drum, and presenting a flange for the latter. The clutch member 108 may be provided with any usual or desired facing material 112, such as leather or asbestos composition commonly used for clutch facings and brake linings, suitably secured thereto, as by rivets 114.

The clutch, commonly referred to by those skilled in the art as a "friction", is operated by axial movement of the drum, herein effected by the use of a screw 116 and nut 118 (see the left-hand side of Fig. 3), one suitably formed on or secured to the bearing 52, and the other appropriately connected with the drum, as by a collar 120 secured to the drum and provided with an inwardly directed flange 122 received in an annular groove 124 provided in the nut 118. A suitable thrust bearing 126, conveniently mounted within the collar 120, receives the thrust developed by the engagement of the clutch members under the influence of the screw and nut effected by turning movement of the latter. The thrust of the mechanism is self-contained,—that is to say, no thrust is exerted against the hangers 44 and 46. One factor in this is the provision of a fixed collar 128, conveniently formed as an integral part of the shaft 68, and seated in a corresponding annular recess in the hub of the clutch member 108.

Assuming the shaft to be running, the drum may be clutched thereto at will, and driven thereby by simply turning the nut in the proper direction to cause the drum to slide along the shaft to bring one clutch member into driving engagement with the other. Turning movement of the nut in the opposite direction naturally disengages the clutch members, and leaves the drum free to rotate with relation to the shaft.

Turning movement of the nut is herein effected by a hand lever designated generally 130, having a split clamping band 132 encircling and clamped about the nut (see Fig. 5) by a pair of studs 134 and nuts 136. Preferably, the lever is collapsible, and to that end herein comprises an arm 138 and a handle 140 connected to each other by a pivot 142, about which the handle may be turned from an operating position represented in full lines in Fig. 10 to a non-operating position shown in dotted lines in Fig. 10, and in full lines in Fig. 2. When the lever is not in use, the handle may be retained in its non-operating position by a suitable retaining means, herein comprising an L-shaped stop 144 (see Fig. 7), and a cooperating spring 146 suitably secured to the worm-gear housing 62, as by bolts 148. The space between the upper portion of the spring and the adjacent upstanding part of the stop 144 is slightly less than the thickness of the grasping portion of the handle. By exerting a sufficient force in an upward direction on the handle, the spring is caused to yield and allow the handle to be withdrawn in an upward direction, during which movement, the whole lever, as well as the nut to which it is secured, will turn about the axis of the shaft. When the handle has cleared the stop, it may be swung on its pivot to a position in alignment with the arm 138. It may be retained in this position by a suitable detent, herein a spring-pressed plunger 150 mounted to slide in the arm 138, and urged in an outward direction by a spring 152 housed in a cylindrical bore 154, which presents a guide for the plunger. The outer end of the latter is herein provided with a suitable beveled, and herein conical, head 156 received in a correspondingly-shaped recess 158 in the segment 160, suitably formed on or secured to the handle 140. If desired, this segment may be provided with another depression 162 to receive the end of the spring-pressed plunger, and to assist in retaining the handle in its non-operating position. If desired, either of the detents for holding the handle in the latter position may be employed to the exclusion of the other.

I will now describe the brake mechanism for controlling the rotation of the drum, reference being had to Figs. 5, 8 and 9. A brake-drum 164 is suitably carried by, and herein conveniently formed as an integral part of, the drum 106, and presents a flange therefor. Encircling and cooperating with the brake-drum is a brake-band 166, herein comprising two separate shoes carrying lugs 168 and 170, through which an adjusting bolt 172 passes, said bolt being provided with a nut 174 and jam-nut 176, by means of which the brake-band may be adjusted to obtain the proper degree of friction on the drum. The other ends of the brake-band are herein provided with terminal eyes 178 and 180. The eye 178 is connected by a pair of links 182 to a floating fulcrum in the form of a pivot 184 (see Fig. 8), carried by the lower end of a swinging arm 186, whose upper end encircles and is mounted to turn about the cross-rod 28. A pair of collars 188, secured to the cross-rod and spaced a suitable distance from the adjacent faces of the arm 186, permit a limited rocking or sliding movement of the arm lengthwise of the rod 28, accompanying lengthwise movement of the rope-winding drum when the latter is moved lengthwise to engage and disengage the clutch.

Also carried by the floating fulcrum is a bell-crank rocker lever 190, having a pair of short arms 192 receiving between them the other eye 180, which is pivoted thereto. The relative arrangement of the pivots is such that rocking movement of the rocker lever in a clockwise direction, as viewed in Fig. 5, carries the eye 180 toward the left, and tends to wrap the brake-band more tightly about the brake-drum, and thereby apply the brake. Swinging movement in a contra-clockwise direction tends to loosen the brake-band and free the drum. This rocking movement of the lever is manually controlled as hereinafter described. Automatic application of the brake to permit rotation of the drum in a winding-on direction (clockwise in Fig. 5) and to prevent reverse rotation is effected by the use of a suitably arranged spring, which constantly tends to urge the floating fulcrum in a contra-clockwise direction,—that is to say, toward the left in Fig. 5. In the present example, I have provided for this purpose a spring 194 encircling a rod 196, said spring bearing at one end against a sliding collar 198 on the rod, and at its other end against an adjustable fixed abutment 200, herein in the form of a pair of nuts threaded onto the rod. The latter passes loosely through an opening 202 provided in an abutment 204 on the swinging arm 186, and this abutment is preferably somewhat rounded, as shown in Fig. 6, thereby presenting a curved seat for the sliding collar 198, and thus permitting a limited swinging movement of the rod 196 in a vertical plane. The spring is held under compression by providing the rod with a head 206, abutting against a suitable fixed abutment 208, best shown in Fig. 6, conveniently formed on an arm 210 projecting laterally from the hanger 44.

Since the rod 196 cannot move toward the right because it is prevented from so doing by the fixed abutment 208, the pressure exerted by the spring 194 constantly urges the swinging arm 186 toward the left, as viewed in Fig. 6. It follows that the floating fulcrum is urged by the spring pressure toward the left, and that any tendency of the brake-drum to rotate in the contra-clockwise direction is resisted by the automatic application of the brake. The latter, however, may be altogether released at will by the provision of suitable releasing mechanism, herein conveniently connected to and operated by the same lever which operates the clutch, the arrangement being such that the clutch and brake can be coordinately controlled by the use of a single lever from the mechanism now to be described.

The rocker lever 190 is herein provided with a longer arm 212 connected by a link 214 to one arm of a lever 216 fulcrumed on a pivot 218 mounted to turn in a suitable bearing 220, best shown in Fig. 3, herein formed as an integral part of the hanger 44. The other arm of the lever is herein forked to receive a collar 222, to which it is pivoted at 224. This collar is mounted to slide on a rod 226, which constitutes a swinging link connecting the pivot 224 to a pivot 228 carried by a pair of short arms 230 suitably formed on the clamping band 132, which it will be remembered is clamped about the clutch operating nut 118. A helically coiled compression spring 232, encircling the rod 226, bears at one end against an abutment 234 at the inner end of the rod, and at its outer end against the sliding collar 222, thereby tending to maintain the latter against an adjustable fixed abutment, herein a pair of nuts 236 threaded onto the rod 226. Rotation of the nut and the clamping collar in a clockwise direction as viewed in Fig. 5 is accompanied by a positive movement of the sliding collar 222, rod 226 and pivot 224 toward the right, thereby rocking the lever 216 contra-clockwise, and acting through the link 214 to lift the long arm 212 of the rocking lever 190, thereby causing the latter to slacken the brake-band and release the brake.

The movement just described is yieldingly resisted by a spring or springs 238 encircling a rod 240 having a forked end 242 connected by a pivot 244 to the lower arm of the brake-releasing lever 216. One end of the spring bears against an abutment 246 carried by the rod, and the other end against a fixed abutment, herein a washer 248 and a plate 250, through which the rod 240 slides. A head 252 on the outer end of the rod limits sliding movement of the latter toward the left, as viewed in Fig. 5, under the influence of the spring 238. The plate 250 is mounted on a suitably fixed support, herein the hanger 44, to which it is appropriately secured, as by cap-screws 254 and 256 extending through the plate, and threaded into the hanger, as best shown in Fig. 11.

Under some circumstances, it may be desirable to have the brake held in its released position, without the intervention of the operator, thus leaving the latter free to use both hands for the manipulation of the cable and drum. One convenient way of accomplishing this is by the provision of a latch 258, best shown in Figs. 11 and 12, conveniently pivoted on the cap-screw 256, and having a forked end 260 which may be brought into position betwen the fixed plate 250 and the head 252 of the rod 240, when the hand lever 130 is fully depressed. Normally this latch occupies the position illustrated in dotted lines in Fig. 12, and it gravitates to such position when released, but it may be lifted manually into the position shown in full lines in Figs. 11 and 12, where it will be held by the pressure exerted by the springs 238 after the hand lever has been released. Subsequently, a slight downward movement of the hand lever will suffice to relieve the latch of the pressure of the spring, and allow the latter to gravitate to the dotted line position shown in Fig. 12.

Figure 4:
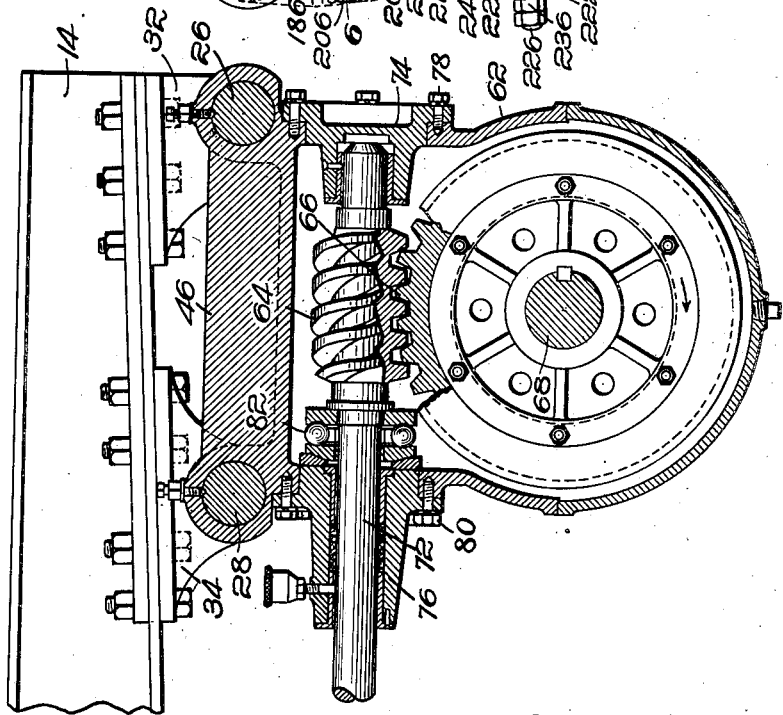
Fig. 4 is a sectional view on an enlarged scale on line 4—4 of Fig. 2.

I will now describe the provisions for the lubrication of the various parts of the apparatus, reference being had to Figs. 3, 4 and 5. Referring first to Fig. 3, the worm and worm-gear are intended to run in a bath of oil contained in the housing 62, and the bearings 70 are herein provided with bushings 262 having oil grooves 264 and 266 to conduct oil to the bearing surfaces of the shaft 68 where the latter runs in said bearings. Any surplus oil which might otherwise run out at the ends of the bearings is caught in circumferential grooves 268 and caused to gravitate through passages 270 to the bottom of the housing.

The drum 106 is herein provided with bushings 272 running on the shaft 38, and having grooves 274 for the proper distribution of lubrication from a chamber 276 intermediate the bushings. This chamber may be supplied with suitable lubrication, such as grease, by a grease-cup 278 through a passage 280 leading into said chamber. Any grease working along the shaft 68 toward the clutch, and which might otherwise find its way to the engaging surfaces of the clutch members and prevent proper action of the clutch, accumulates on a circumferential ridge 282 provided at the corner of the hub of the clutch member 108, and is thrown off by the action of centrifugal force into an annular groove 284 provided in the clutch member 110, whence it is conducted by one or more passages 286 leading to any convenient point where it will be drawn off without danger of its reaching the engaging surfaces. In the present example, the passages 286 lead to the cylindrical surface on which the cable is wound, and in the use of a steel cable, this is highly advantageous because the grease or oil is utilized to lubricate the cable and prevent undue wear on the latter.

Referring now to the left-hand part of Fig. 3, the clutch-operating screw and nut are herein lubricated by grease fed from a grease cup 288 (see Fig. 5), which feeds grease through a passage 290 to a circumferential groove 292 (see Fig. 3), whence it passes through one or more, herein a plurality of radial passages 294 to the engaging surfaces of the screw and nut. The surplus grease works along the shaft 68 to the thrust bearing 126, and lubricates the latter.

The spherical bearing 52 is herein provided with a bushing 296 having a groove 298 which receives grease from a grease cup 300, and the excess grease works along the shaft 68 into one or more grooves 302 provided in the adjacent face of the thrust washer 90, thus lubricating the latter.

The general operation of the apparatus hereinbefore specifically described is as follows: Let it be assumed that power is supplied to the worm-shaft to cause the worm-gear to be driven clockwise, as viewed in Fig. 4. Either of the winches may be used in an obvious manner for the handling of a cable, one end of which is attached to the load and the other held in the hands of the operator. It is intended that a cable shall be suitably attached at one end in any usual manner to the winding drum 106, and led in a rearward direction (toward the right as viewed in Fig. 5) from the under side of the drum. This being so, it is evident that when the drum is clutched to the shaft, the cable will be wound onto the drum. Since the brake is automatic, reverse rotation of the drum is prevented, if for any reason the power should fail, and also to hold the load suspended at any desired point when the application of power is discontinued. When, however, the operator wishes to lower the load, this can be done by simply depressing the hand lever to whatever extent is necessary to allow the drum to rotate in the reverse direction, it being understood, of course, that the speed of descent of the load can be regulated at will by varying the position of the hand lever. It should also be understood that when the lever is pushed downward to apply the brake, the screw and nut operate on the clutch, disengaging the latter. Thus the operation of the clutch and brake is coordinated, and they are controlled by one hand of the operator, leaving the other free for other purposes. When the operator wishes to arrange the coils of the cable on the drum, or for any other reason to turn the latter freely in either direction with his hands, this is possible by depressing the hand lever to its fullest extent, then lifting the latch into its locking position, and finally releasing the hand lever, thus causing the latch to hold the brake mechanism in its released position,—yet providing for instant reengagement of the brake by a sufficient depression of the hand lever to allow the latch to gravitate to its initial position.

Having thus described one embodiment of my invention, but without limiting myself thereto, what I claim and desire by Letters Patent to secure is:—

1. In a motor truck, the combination of a chassis frame comprising a pair of longitudinal bars, brackets secured to the under side of said bars, means presenting a transverse support supported by said brackets and extending transversely of said longitudinal bars adjacent the rear end of said frame, hangers depending from said transverse support, a shaft supported by said hangers beneath said support, and cable-winding means supported by said shaft.

2. In a motor truck, the combination of a chassis frame comprising a pair of longitudinal bars, brackets secured to the under side of and depending from said bars, means presenting a transverse support supported by said brackets and extending transversely of said longitudinal bars adjacent the rear end of said frame, hangers depending from said transverse support, a shaft supported by said hangers beneath said support, and cable-winding means supported by said shaft.

3. In a motor truck, the combination of a chassis frame comprising a pair of longitudinal bars, brackets secured to the under side of said bars, means presenting a transverse support supported by said brackets and extending transversely of said longitudinal bars adjacent the rear end of said frame, hangers depending from said transverse support intermediate said brackets, a shaft supported by said hangers beneath said support, and cable-winding means supported by said shaft.

4. In a motor truck, the combination of a chassis frame comprising a pair of longitudinal bars, brackets secured to the under side of said bars, means presenting a transverse support supported by said brackets and extending transversely of said longitudinal bars adjacent the rear end of said frame, hangers depending from said transverse support intermediate said longitudinal bars, a shaft supported by said hangers beneath said support, and cable-winding means supported by said shaft.

5. In a motor truck, the combination of a chassis frame comprising a pair of generally parallel supporting bars, a pair of generally parallel rods supported by and extending transversely of said bars adjacent the rear end of said chassis frame, hangers depending from said rods, a shaft supported by said hangers beneath said bars, and cable-winding means supported by said shaft.

6. In a motor truck, the combination of a chassis frame comprising a pair of generally parallel supporting bars, a pair of generally parallel rods supported by and extending transversely of said bars adjacent the rear end of said chassis frame hangers depending from said rods, a shaft supported by said hangers beneath said bars, a cable-winding drum supported by said shaft, clutch mechanism for driving said drum, and brake mechanism for stopping said drum, said brake mechanism being supported by said rods.

7. In a motor truck, the combination of a chassis frame comprising a pair of generally parallel supporting bars, a pair of generally parallel rods supported by and extending transversely of and beneath said bars adjacent the rear of said chassis frame, hangers depending from said rods, a shaft supported by said hangers below said rods, a cable-winding drum supported by said shaft, and a clutch also supported by said shaft for driving said drum.

8. In a vehicle, the combination of a frame, springs supporting said frame, a rod extending transversely of and presenting pivotal connections between said springs and frame, hangers depending and deriving support from said rod, and cable-winding mechanism including a shaft mounted to turn in said hangers beneath said frame and said rod.

9. In a machine of the class described, the combination of cable-winding mechanism including a driving member, a cable-winding drum driven thereby, a controlling lever for establishing and interrupting the driving connection between said driving member and said drum, said lever including an arm extending transversely of the axis of said drum and pivoted to swing about an axis extending lengthwise of said drum, a handle pivoted to said arm and adapted to be swung to and fro relatively to said arm from an operating position in which it extends transversely of the axis of said drum to a non-operating position in which it extends longitudinally of the axis of said drum, and retaining means for retaining said handle in said non-operating position, said retaining means including a stop and a cooperating spring between which said handle is held by the stress of said spring.

10. In a truck, the combination of a chassis frame, cable-winding mechanism carried by said frame including a driving member, a cable-winding drum driven thereby and extending transversely of said frame, a controlling lever for establishing and interrupting the driving connection between said driving member and said drum, said lever including an arm and a handle pivoted to said arm to swing from an operating position in which it extends longitudinally of said frame to a non-operating position transversely of said frame, and retaining means for retaining said handle in said non-operating position.

11. In a machine of the class described, the combination of cable-winding mechanism including a driving member and a driven member, and a controlling lever for establishing and interrupting the driving connection between said members, said lever being fulcrumed to swing about an axis extending lengthwise of the axis of said members, and said lever comprising two jointed parts, one having an operating position in which it extends transversely of said axes and a non-operating position in which it extends longitudinally of said axes.

12. In a machine of the class described, the combination of a cable-winding drum, a clutch for driving said drum, and a clutch-actuating lever including two parts, both normally extending transversely of the axis of said drum and clutch, one of said parts being hinged to the other for movement into a non-operating position in which it extends longitudinally of said drum.

In testimony whereof, I have signed my name to this specification.

VIVIAN L. FARNSWORTH.